(12) United States Patent
Cross et al.

(10) Patent No.: US 11,573,109 B2
(45) Date of Patent: Feb. 7, 2023

(54) MEASUREMENT OF FLUID PARAMETERS

(71) Applicant: Houghton Technical Corp., Wilmington, DE (US)

(72) Inventors: Alan E. Cross, Yardley, PA (US); John M. Burke, Kirtland, PA (US)

(73) Assignee: HOUGHTON TECHNICAL CORP., Wilmington, DE (US)

(*) Notice: Subject to any disclaimer, the term of this patent is extended or adjusted under 35 U.S.C. 154(b) by 548 days.

(21) Appl. No.: 16/687,947

(22) Filed: Nov. 19, 2019

(65) Prior Publication Data

US 2020/0209032 A1    Jul. 2, 2020

Related U.S. Application Data

(60) Provisional application No. 62/784,946, filed on Dec. 26, 2018.

(51) Int. Cl.
*G01F 1/74* (2006.01)
*F16K 7/04* (2006.01)
*G01N 21/41* (2006.01)

(52) U.S. Cl.
CPC ............... *G01F 1/74* (2013.01); *F16K 7/045* (2013.01); *G01N 21/4133* (2013.01)

(58) Field of Classification Search
CPC .......................................................... G01F 1/74
USPC ...................................................... 73/861.04
See application file for complete search history.

(56) References Cited

U.S. PATENT DOCUMENTS

| 6,067,151 A | 5/2000 | Salo | |
| 2016/0051742 A1* | 2/2016 | Strohhöfer | A61M 1/367 |
| | | | 210/85 |
| 2017/0316679 A1 | 11/2017 | Gorr | |
| 2019/0204225 A1* | 7/2019 | Zhong | G01N 21/6454 |

OTHER PUBLICATIONS

Katzenmeier et al. Machine Translation of WO 2020126457. Published Jun. 2020. Priority date Dec. 2018. Accessed Apr. 2022. (Year: 2018).*

* cited by examiner

*Primary Examiner* — Walter L Lindsay, Jr.
*Assistant Examiner* — Philipmarcus T Fadul
(74) *Attorney, Agent, or Firm* — Morgan, Lewis & Bockius LLP

(57) ABSTRACT

An instrument incorporating a refractometer for measuring parameters of a fluid such as a metalworking fluid, avoids impairment of measurement accuracy due to contact of entrained air and oil with a refractometer window by temporarily interrupting the flow of the fluid through a refractometer chamber and orienting the window so that air and oil will readily separate from the window during the interruption of flow. Continued flow of metalworking flow while refractive index measurements are taken can be achieved by the use of by-pass valving arrangements.

16 Claims, 3 Drawing Sheets

MEASUREMENT OF FLUID PARAMETERS

CROSS-REFERENCE TO RELATED APPLICATIONS

This application claims the benefit of the priority of U.S. Provisional Patent Application No. 62/784,946, filed Dec. 26, 2018, which application is incorporated herein by reference.

FIELD OF THE INVENTION

This invention relates to an apparatus and method for measuring a parameter of a fluid passing through a conduit, and more particularly to an apparatus and method having utility in the measurement of a parameter of a metalworking fluid contaminated with a contaminant comprising air, tramp oil, or a combination of air and tramp oil.

BACKGROUND OF THE INVENTION

Metalworking operations often use water-dilutable products such as metalworking fluids, cleaners, aqueous quenchants, and hydraulic fluids. The concentration of the product in water can be measured by a refractometer, which measures the refractive index of a fluid. The value of the refractive index can then be used to determine the concentration of the product diluted in water.

In many metalworking operations, extraneous oils (referred to as "tramp oils") contaminate the metalworking fluid due to leakage from hydraulic oil systems, way lubricant systems, and other sources of machining oils. When these oils become mixed with the metalworking fluid they can cause errors in the measurement the refractive index of the fluid. The tramp oils do not completely emulsify in the metalworking fluid, but become dispersed throughout the fluid and are generally unstable. The errors in the measurement of the refractive index of the metalworking fluid arise because the oil does not have a refractive index, and the oil can coat the lens (also referred to as the "window") of the refractometer, preventing the sensor of the refractometer from responding accurately to light reflected by the metalworking fluid.

In a laboratory environment, the tramp oil is typically removed by advanced methods including the use of oil-separating chemicals such cationic polymers or quaternary amines, oil-separation with strong acids and/or salts, heating the fluid to reduce separation time, centrifuging, and combinations the above methods.

The density of the tramp oil is lower than that of a metalworking fluid. The oil floats to the surface when the fluid is when left undisturbed. Thus separation can also be carried out by flotation and skimming. However, separation by flotation often takes large amounts of time. The amount of time it takes for tramp oils to float is dependent in part on the type of metalworking fluid, the type of oil, temperature of the metalworking fluid/oil mixture, the viscosities of both the metalworking fluid and oil, and the mutual partial solubility of the metalworking fluid and oil. The amount of time required for the tramp oil to float can range from several minutes to a day or more.

During metalworking operations, metalworking fluids are typically sprayed, pumped, and mixed. Agitation in the spraying, pumping and mixing processes will often cause entrainment of air, i.e., dispersion or solution of air into the metalworking fluids. Thus entrained air includes air bubbles, micro bubbles, and dissolved air. This entrained air can also cause errors in the measurement of the refractive index of the metalworking fluid, by preventing the sensor of the refractometer from responding accurately to light reflected by the metalworking fluid.

Entrained air will float to the surface over time when the fluid is allowed to sit undisturbed. The amount of time it takes for the air to completely float to the surface is dependent on, but not limited to the viscosity of the metalworking fluid, its temperature, the type of the entrained air (bubbles, micro bubbles, and dissolved air) and the size of the air bubbles. The time required for extraneous air to evacuate the fluid can range from several minutes to around one hour.

A typical inline or in-process refractometer operates by having a continuous stream of fluid flowing across the sensor=lens. This allows the sensor to measure the fluid continuously and provides real-time fluid measurements. The continuous flow causes both the entrained air and tramp oil dispersion to remain relatively stable. Consequently the sensor is unable to measure accurately the refractive index of the metalworking fluid.

Laboratory tests have shown that an emulsifiable-oil metalworking fluid with 4% by volume of tramp oil and a high level of entrained air will usually cause an inline refractometer installed in accordance with manufacturer=s recommendation (i.e., utilization of continuous fluid flow across a horizontally-facing lens) to stop reading a sample.

SUMMARY OF THE INVENTION

Briefly, in accordance with the invention, the accuracy of refractometer measurements is improved by temporarily discontinuing the flow of the metalworking fluid through a refractometer for an interval sufficient to allow water and entrained air to migrate away from the window, and then taking a reading of the refractive index of the fluid.

The measuring apparatus in accordance with the invention comprises a chamber arranged to form a part of a conduit through which a fluid such as a metalworking fluid passes in a processing operation. The chamber has an inlet for receiving fluid from a first part of said the conduit and an outlet for delivering fluid to a second part of the conduit. The apparatus includes a refractometer having an optically transparent window with a face forming a part of an inner wall of the chamber. A valve is provided for temporarily interrupting the flow of fluid through the chamber. At least a part of the face of the window is positioned at a location below the uppermost part of the chamber, faces in a direction other than vertically downward. Following an interruption of the flow of fluid through the chamber, a refractive index measurement is taken after an interval sufficient to allow air and entrained oil to migrate away from the refractometer window.

The refractometer preferably comprises a light source located outside the chamber and arranged to project light toward fluid within the chamber through the window. A refractive index sensor, also outside the chamber, receives light from the light source reflected by the fluid. The light source is arranged to direct light toward the interior of the chamber through a region of the face of the window that is positioned at a location below the uppermost part of the chamber. The refractive index sensor is arranged to receive light reflected from an interface between the face of the window and the fluid within the chamber also through the region of the face of the window positioned below the uppermost part of the chamber.

In one preferred embodiment of the invention, the face of the window forms a part of a bottom wall of the chamber and faces substantially vertically upward toward the interior of the chamber. In another preferred embodiment, the face of the window forms a part of a side wall of the chamber and faces substantially horizontally toward the interior of the chamber.

Fluid flows out of the chamber through an outlet having an opening in an inner wall of the chamber. The lowest part of this opening of the outlet is preferably located at a level higher than the level of the uppermost part of the inlet. The lowermost part of this opening of the outlet should also be located at a level higher than the highest part of the region of the refractometer window through which light from the light source passes into and out of the chamber, in order to prevent the fluid level from dropping below the sensor due to siphoning.

The flow-interrupting valve is preferably located in the part of the conduit through from which the inlet of the chamber receives fluid. A by-pass port is preferably provided for allowing continued flow of fluid through the valve through a path other than through the chamber when flow through the chamber is interrupted.

In an alternative embodiment, a second valve is connected to a portion of the conduit from which the inlet of the chamber receives fluid, upstream of the flow-interrupting valve. The second valve can be opened to allow continued flow of fluid through a by-pass path.

A valve control actuator and a valve control responsive to the actuator can be provided for automatically closing the flow-interrupting valve for a predetermined interval.

Another aspect of the invention is a method for measuring a parameter of a metal working fluid contaminated with a contaminant comprising air, tramp oil or a combination of air and tramp oil. The metal working fluid normally passes continuously through a conduit including first and second parts, and a chamber, the chamber having an inlet for receiving fluid from the first part and an outlet for delivering fluid to the second part. Flow of the metal working fluid through the chamber is interrupted, and, after a predetermined interval following the interruption of flow, the refractive index of a portion of the fluid in the chamber is measured by means of a refractometer having a window forming part of a wall of the chamber, by causing light from a light source external to the chamber to be reflected to a refractive index sensor also external to the chamber, from an interface between the fluid in the chamber and a surface of the window facing the interior of the chamber. The predetermined interval is sufficient to allow the contaminants to move away from the interface by flotation. The predetermined interval should be at least thirty seconds, and preferably in the range from thirty seconds to 600 seconds.

DETAILED DESCRIPTION OF THE PREFERRED EMBODIMENTS

Figure 1:
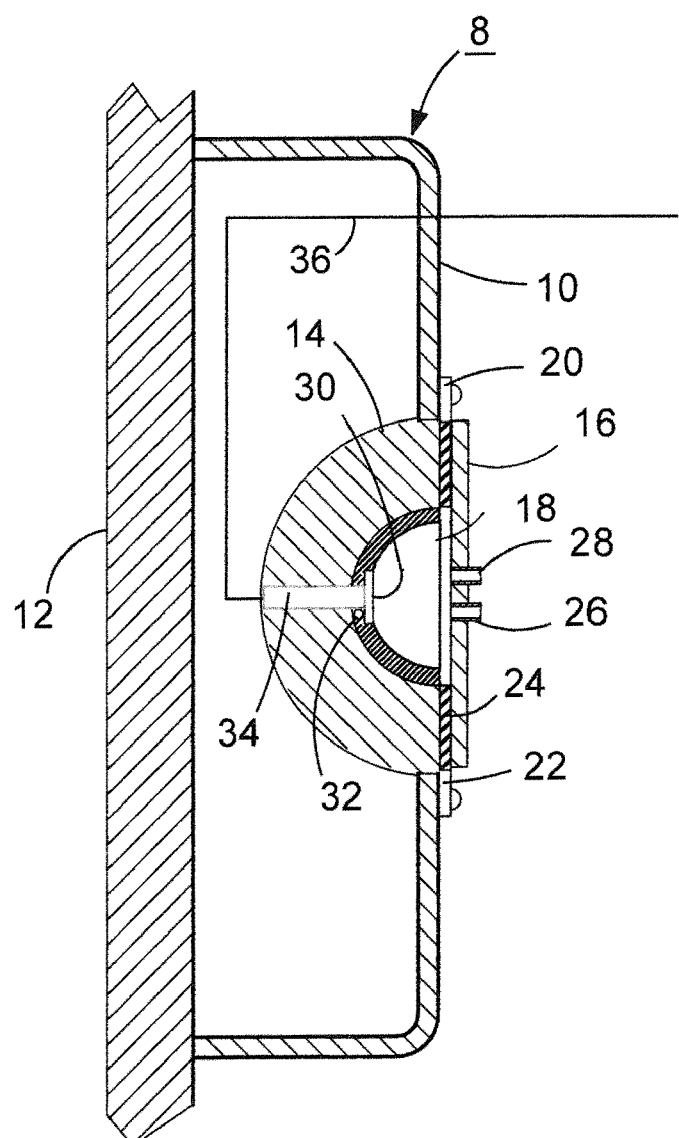
FIG. 1 is a cross-sectional view of an apparatus including a fluid chamber forming a part of a fluid conduit and a refractometer having an optically transparent window with a face forming a part of an inner wall of the fluid chamber.

The apparatus 8 shown in FIG. 1 comprises an outer case 10 secured to a support 12, which in this embodiment, is a vertical panel. A liquid vessel 14 mounted within the case cooperates with a cover 16 to define a hemispherical liquid chamber 18. The cover is secured to the case by hold-down brackets 20 and 22 and sealed by a ring 24 to the vessel 14. The cover is provided with an inlet port 26 for the flow of fluid into chamber 18 and an outlet port 28 for the flow of fluid out of the chamber. In this embodiment, the inlet port is located below the outlet port.

A window 30 is supported on a wall of the chamber so that its inner face, i.e., the surface facing toward the interior of the chamber 18, is vertical. A light source 32 is mounted behind the lens, and a sensor 34 is mounted in the wall of vessel 14, also behind the lens. The lowest part of the opening of the outlet port 28 should be at a level above the level of the uppermost part of the region of the face of the window 30 through which the light from light source 32 passes as it is directed toward the liquid in the chamber 18 and reflected by the liquid in chamber 18 to the sensor 34. This will prevent the liquid level in the chamber from dropping, e.g., as a result of a siphoning action, to a level below the level below the level of the above-mentioned uppermost part of the region of the face of the window.

The lens 30, light source 32 and sensor 34 cooperate to serve as a refractometer, producing an electrical signal in cable 36, representing the refractive index of the fluid within the chamber. Cable 36 can also be utilized to control, and deliver operating power to, the refractometer.

The principles of operation of the refractometer are explained in U.S. Pat. No. 6,067,151, granted on May 23, 2000, and the entire disclosure of U.S. Pat. No. 6,067,151 is here incorporated by reference. A refractometer as described in that patent, and similar refractometers, can be utilized in the apparatus of this invention.

Figure 2:
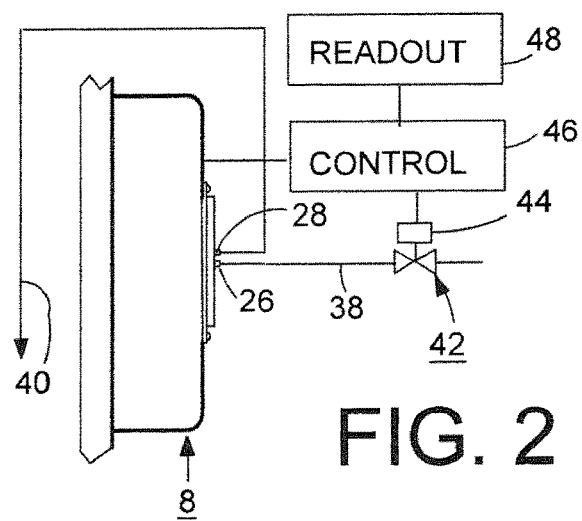
FIG. 2 is a schematic view of a first embodiment of a fluid parameter measurement apparatus in accordance with the invention, in which the fluid chamber is oriented so that the face of the refractometer window forms a part of a bottom wall of the fluid chamber and faces substantially vertically upward toward the interior of the chamber.
Figure 3:
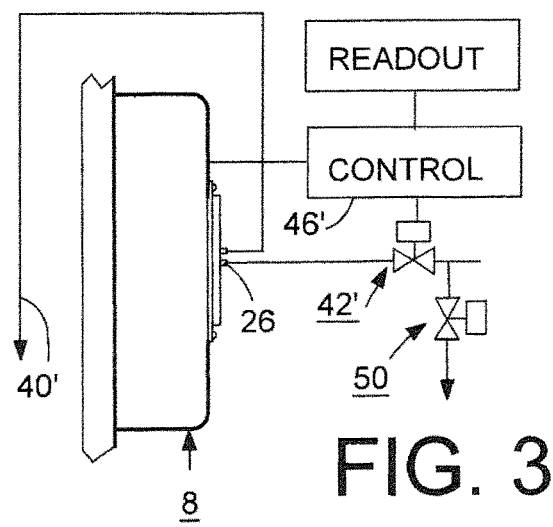
FIG. 3 is a schematic view of a second embodiment, similar to the embodiment of FIG. 2, but having a modified valve configuration.
Figure 4:
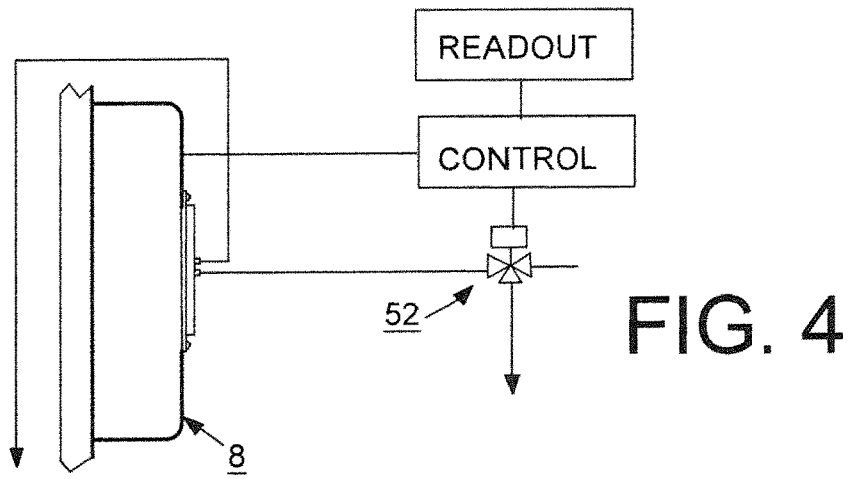
FIG. 4 is a schematic view of a second embodiment, similar to the embodiments of FIGS. 2 and 3, but having another modified valve configuration.

FIGS. 2, 3 and 4 depict three alternative valve arrangements for interrupting the flow of metalworking fluid through the refractometer chamber.

In FIG. 2, the fluid flows from a source into the chamber through inlet port 26 through a first part 38 of a conduit, and outward from the chamber through outlet port 28 and through a second conduit part 40. Flow though conduit part 38 is interrupted by a simple valve 42 having an actuator 44 controlled by a controller 46. The controller can be a simple interval timer, and can be adjusted to establish an interruption interval suitable to ensure accurate refraction index readings for a particular fluid being utilized. A programmed logic control can also be utilized for this purpose.

The controller 46 can also control the operation of the refractometer through cable 36. The refractive index of the fluid is displayed on readout display unit 48, which preferably also records the reading.

In the operation of the apparatus shown in FIG. 2, the controller 46 closes valve 42, interrupting the flow of working fluid. After a predetermined interval sufficient to ensure that tramp oil and entrained air separate from the refractometer window, an interval typically from 30 seconds to 10 minutes, a refraction index reading is taken and, flow is resumed by automatic opening of valve 42.

The valve arrangement in FIG. 3 a valve 42', similar to valve 42, is used to interrupt the flow of fluid into the refractometer chamber though the inlet port 26. In addition, a by-pass valve 50 in the conduit part leading to valve 42 can be opened by the controller 46' when valve 42' is closed, thereby allowing flow in the system to continue while the refractive index is read. The outlet of valve 50 can be connected to downstream conduit part 40', which carries fluid that flows away from the apparatus through outlet port 28. A one-way valve (not shown) may be utilized, if necessary, to prevent reverse flow though conduit part 40'.

The valve arrangement of FIG. 4 is similar to the valve arrangement of FIG. 3, except that, instead of using two valves 42' and 50, a single three-port diverting valve 52 is used.

Figure 5:
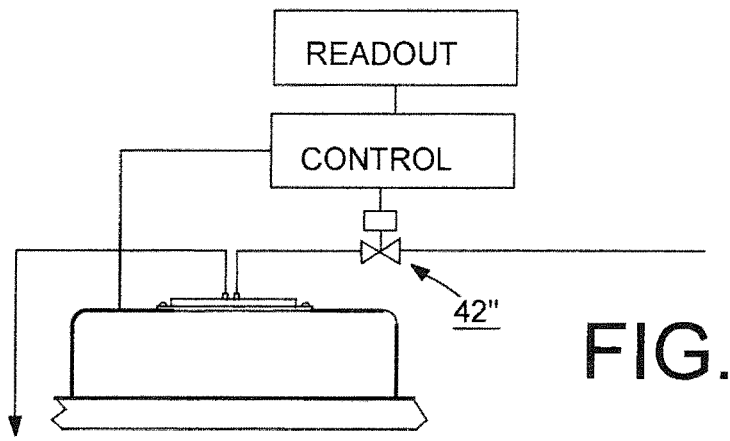
FIG. 5 is a schematic view of a first embodiment of a fluid parameter measurement apparatus in accordance with the invention, in which the fluid chamber is oriented so that the face of the refractometer window forms a part of a side wall of the chamber and faces substantially horizontally toward the interior of the chamber.
Figure 6:
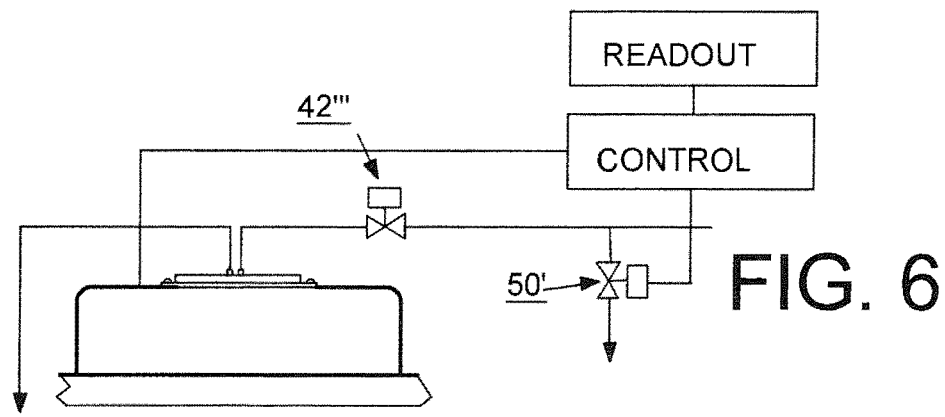
FIG. 6 is a schematic view of a second embodiment, similar to the embodiment of FIG. 4, but having a modified valve configuration.
Figure 7:
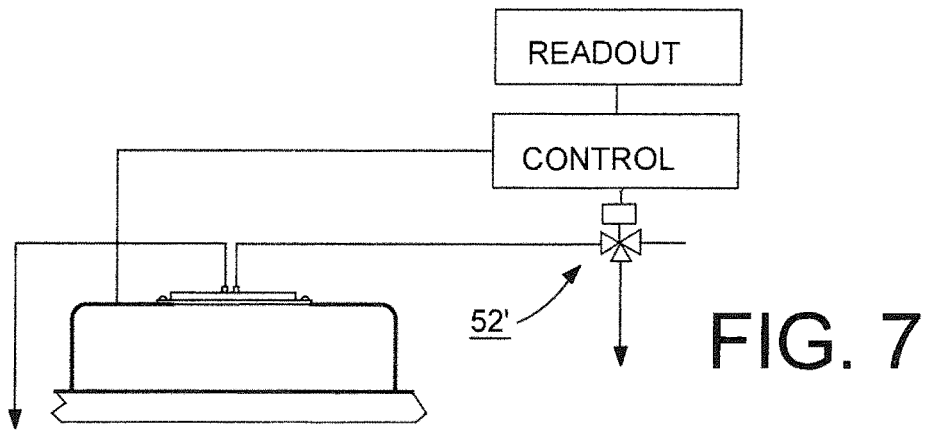
FIG. 7 is a schematic view of a second embodiment, similar to the embodiments of FIGS. 5 and 6, but having another modified valve configuration.

The embodiments in FIGS. 5, 6 and 7 are similar to the embodiments of FIGS. 2, 3 and 4 respectively, except that the housing of the apparatus comprising the chamber and refractometer is oriented so that the refractometer window is at the bottom of the chamber and faces vertically upward. The embodiment in FIG. 5 utilizes a simple flow interrupting valve 42"; the embodiment in FIG. 6 utilizes a flow interrupting valve 42''' together with a by-pass valve 50'; and the embodiment in FIG. 7 utilizes a three-port diverting valve 52'.

In the embodiments of FIGS. 5, 6 and 7, the inlet and outlet ports are both at the top of the chamber, and there openings into the chamber are at the same level.

The orientation in which the refractometer window faces vertically upward can potentially achieve more rapid separation of the entrained air and oil from the face of the window, thereby shortening the interval between the interruption of flow and the reading of the refractive index of the fluid.

The orientation of the face of the refractometer window should be other than vertically downward, and is preferably either substantially horizontal, substantially vertically upward, or at an angle between horizontal and vertically upward, as a downward orientation or an oblique orientation having a downward component can impair the separation of air and oil from the face of the window.

Various modifications can be made to the apparatus describe above. For example, any of a wide variety of refractometers, and alternative valving arrangements for interruption of flow, can be can be utilized in the apparatus. In addition, the apparatus can utilize various alternative controls for effecting flow interruption and for operating the refractometer and reading and recording its measurements.

What is claimed is:

1. An apparatus for measuring a refractive index of a metal working fluid passing through a conduit, the apparatus comprising:

a chamber forming a part of the conduit, the chamber having an inlet for receiving metal working fluid from a first part of the conduit and an outlet for delivering metal working fluid to a second part of the conduit;

a refractometer having an optically transparent window with a face forming a part of an inner wall of the chamber; and a flow-interrupting valve for temporarily interrupting the flow of metal working fluid through the chamber, wherein the flow-interrupting valve temporarily interrupts the flow of fluid through the chamber, allowing contaminants selected from water, air, tramp oil, or a combination thereof in the metal working fluid to migrate away from the window;

wherein at least a part of the face of the window is positioned at a location below the uppermost part of the chamber, and faces in a direction other than vertically downward; and wherein after a predetermined interval following the interruption of flow of the metal working fluid which is sufficient for the contaminants in the metal working fluid to migrate away from the window, the refractometer measures the refractive index of the metal working fluid.

2. The apparatus according to claim 1, in which the refractometer comprises a light source outside the chamber arranged to project light toward fluid within the chamber through the window, and a refractive index sensor also outside the chamber for receiving light from the light source reflected by the metal working fluid, in which the light source is arranged to direct light toward the chamber through the part of the face of the window, and in which the refractive index sensor is arranged to receive light reflected from an interface between the face of the window and fluid within the chamber through the part of the face of the window.

3. The apparatus according to claim 1, in which the face of the window forms a part of a bottom wall of the chamber and faces substantially vertically upward toward the interior of the chamber.

4. The apparatus according to claim 1, in which the face of the window forms a part of a side wall of the chamber and faces substantially horizontally toward the interior of the chamber.

5. The apparatus according to claim 1, in which the refractometer comprises a light source outside the chamber arranged to project light toward fluid within said chamber through the window, and a refractive index sensor also outside the chamber for receiving light from the light source reflected by the fluid, in which the light source is arranged to direct light toward the chamber through the part of the face of the window, in which the refractive index sensor is arranged to receive light reflected from an interface between the face of the window and fluid within the chamber through the part of the face of the window, and in which the face of the window forms a part of a bottom wall of the chamber and faces substantially vertically upward toward the interior of the chamber.

6. The apparatus according to claim 1, in which the refractometer comprises a light source outside the chamber arranged to project light toward fluid within the chamber through the window, and a refractive index sensor also outside the chamber for receiving light from the light source reflected by the metal working fluid, in which the light source is arranged to direct light toward the chamber through the part of the face of the window, in which the refractive index sensor is arranged to receive light reflected from an interface between the face of the window and fluid within the chamber through the part of the face of the window, and in which the face of the window forms a part of a side wall of the chamber and faces substantially horizontally toward the interior of the chamber.

7. The apparatus according to claim 1, in which the outlet has an opening in an inner wall of said chamber, through which metal working fluid flows from the chamber through the outlet, and in which the lowermost part of the opening is located at a level higher than the level of the uppermost part of the inlet.

8. The apparatus according to claim 1, in which the refractometer comprises a light source and a sensor, the light source and sensor being arranged so that light from the light source is directed toward the chamber through a region of the refractometer window and reflected from an interface between the face of the window and metal working fluid in the chamber through the region of the refractometer window, in which the outlet has an opening in an inner wall of said chamber, through which metal working fluid flows from the chamber through the outlet, and in which the lowermost part of the opening is located at a level higher than the uppermost part of the region of the refractometer window.

9. The apparatus according to claim 1, in which the flow-interrupting valve is located in the first part of the conduit.

10. The apparatus according to claim 1, in which the flow-interrupting valve is located in the first part of the conduit and includes a by-pass port for allowing continued flow of metal working fluid through the valve through a path other than through the chamber when flow through the chamber is interrupted.

11. The apparatus according to claim 1, in which the flow-interrupting valve is located in the first part of the conduit, and including a second valve connected to a portion of the first part of the conduit upstream of the flow-interrupting valve, whereby the second valve can be opened to allow continued flow of metal working fluid through a by-pass path from the first part of the conduit upstream of the flow-interrupting valve.

12. The apparatus according to claim 1, including a valve control actuator and a valve control responsive to the actuator for automatically closing the flow-interrupting valve for a predetermined interval.

13. An apparatus for measuring a refractive index of a metal working fluid passing through a conduit, the apparatus comprising:
   a chamber forming a part of the conduit, the chamber having an inlet for receiving metal working fluid from a first part of the conduit and an outlet for delivering metal working fluid to a second part of the conduit;
   a refractometer having an optically transparent window with a face forming a part of an inner wall of the chamber; and
   a flow-interrupting valve for temporarily interrupting the flow of metal working fluid through the chamber, wherein the flow-interrupting valve temporarily interrupts the flow of fluid through the chamber, allowing contaminants selected from water, air, tramp oil, or a combination thereof in the metal working fluid to migrate away from the window;

wherein:
   at least a region of the face of the window is positioned at a location below the uppermost part of the chamber and, faces in a direction other than vertically downward;
   the refractometer comprises a light source outside the chamber arranged to project light toward the metal working fluid within the chamber through the window, and a refractive index sensor also outside the chamber for receiving light from the light source reflected by the metal working fluid, in which the light source is arranged to direct light toward the chamber through the region of the face of the window, in which the refractive index sensor is arranged to receive light reflected from an interface between the face of the window and metal working fluid within the chamber through the region of the face of the window;
   the outlet has an opening in an inner wall of the chamber, through which metal working fluid flows from the chamber through the outlet;
   the lowermost part of the opening is located at a level higher than the uppermost part of the region of the face of the window; and
   the flow-interrupting valve is located in the first part of the conduit; and
   after a predetermined interval following the interruption of flow of the metal working fluid which is sufficient for the contaminants in the metal working fluid to migrate away from the window, the refractometer measures the refractive index of the metal working fluid.

14. A method for measuring a parameter of a metal working fluid contaminated with a contaminant comprising air, tramp oil or a combination of air and tramp oil, wherein the metal working fluid normally passes continuously through a conduit, the conduit including first and second parts, and a chamber, the chamber having an inlet for receiving fluid from the first part and an outlet for delivering fluid to the second part comprising:
   interrupting the flow of the metal working fluid through the chamber; and
   after a predetermined interval following the interruption of flow of the metal working fluid, measuring the refractive index of a portion of the fluid in the chamber by means of a refractometer having a window forming part of a wall of the chamber, by causing light from a light source external to the chamber to be reflected to a refractive index sensor also external to the chamber, from an interface between the fluid in the chamber and a surface of the window facing the interior of the chamber;
   in which the predetermined interval is sufficient to allow the contaminants to move away from the interface by flotation.

15. The method according to claim 14, in which the predetermined interval is at least thirty seconds.

16. The method according to claim 14, in which the predetermined interval is in the range from thirty seconds to 600 seconds.

* * * * *